US006563874B1

United States Patent
Lu

(10) Patent No.: US 6,563,874 B1
(45) Date of Patent: May 13, 2003

(54) FAST SEARCH METHOD FOR MOTION ESTIMATION

(75) Inventor: Naiqian Lu, Fremont, CA (US)

(73) Assignee: Hitachi America, Ltd., Brisbane, CA (US)

( * ) Notice: Subject to any disclaimer, the term of this patent is extended or adjusted under 35 U.S.C. 154(b) by 403 days.

(21) Appl. No.: 09/603,316

(22) Filed: Jun. 23, 2000

(51) Int. Cl.[7] .................................................. H04N 7/36
(52) U.S. Cl. ............. 375/240.12; 348/699; 375/240.08; 375/240.1
(58) Field of Search ........................ 375/240.12, 240.08, 375/240.1; 348/699; H04N 7/36

(56) References Cited

U.S. PATENT DOCUMENTS 5,710,602 A * 1/1998 Gardos et al. ............... 348/586
5,883,971 A * 3/1999 Bolle et al. ................. 382/124
6,404,901 B1 * 6/2002 Itokawa ....................... 382/103

* cited by examiner

Primary Examiner—Howard Britton
(74) Attorney, Agent, or Firm—Townsend and Townsend and Crew LLP

(57) ABSTRACT

A video compression method of estimating a motion vector representative of a difference between a reference frame and a current frame is described. Typically, both the reference frame and the current frame include background and foreground data. In the method a block of the current frame is selected for analysis, and a determination is made whether the block selected is a foreground block or a background block. If the block is a foreground block, then it is compared with predetermined search points in the reference frame. On the other hand, if the block is a background block, it is compared with predetermined search points in only a portion of the reference frame.

17 Claims, 4 Drawing Sheets

FAST SEARCH METHOD FOR MOTION ESTIMATION

BACKGROUND OF THE INVENTION

This invention relates to the processing of video, and in particular to a technique for compression of video data in which a foreground image is separated from a background image for estimation of motion vectors.

Compressed video technology is growing in importance and utility. Analog or digital "NTSC-like" video transmissions require bit rates on the order 100 megabits per second. Compression technology today can reduce the required bit rate to less than 5 megabits per second. This is typically achieved using digital signal processing or VLSI integrated circuits.

Depending upon the ultimate bit rate and quality of the desired image, different types and levels of compression can be employed. Generally, the compression removes different types of redundancy from the video image being compressed. In doing so, the image is typically broken into groups of pixels, typically blocks on the order of 16 pixels by 16 pixels. By comparing different blocks and transmitting only information relating to the differences between the blocks, significant reductions in bit rate are achieved.

In addition, because some information within a block is imperceptible to the viewer, vector quantization or discrete cosine transforms can be used to remove bits corresponding to imperceptible or unimportant details. This further reduces the required bit rate, but may introduce certain degradation in the resulting image quality. A third technique for reducing the bit rate, and of primary focus here, is that stationary images, or moving objects, do not necessarily require retransmission of every detail. Motion compression techniques can be used to eliminate redundancies between frames. This is typically achieved by identification of a block of pixels which is considered "moved" between two frames. Then transmission of only the motion vector information, in place of all of the pixel data, effectively transmits the new location of the block for reconstruction at the decomposer.

In many video scenes, an object moves against an essentially unchanging background. In such circumstances, most of the background data can remain the same for frame after frame of the video data, with the foreground object being shifted and revised as needed. One such example is videoconferencing in which the overall room or setting for the videoconference remains essentially unchanged. In the foreground, however, individuals may be speaking or gesturing. For such applications it is desirable to perform motion estimation. In motion estimation a vector is determined which relates the content of one video frame to the content of another video frame. For example, the vector might indicate the direction of motion of a portion of the contents of the earlier video frame. Use of such motion estimation enables video recording to use fewer bits. This is because the background portion of the scene can be characterized as having the same or almost the same data as the preceding frame, while the object in the foreground can be characterized as being essentially the same as an earlier frame, but moved to a new location.

FIG. 1 illustrates the motion estimation process. In FIG. 1b a current frame (picture) is shown, while FIG. 1 a shows a reference frame . It is desired to characterize the content of the current picture as being the same as the content of the reference picture, but with a changing portion of the current picture, designated the "block" in the reference picture, together with a motion vector (u, v). The location of the block is usually given by the coordinates of its upper left corner, together with some information about its size.

One computationally intensive approach for determining the reference vector is to search the entire frame for the best fit. Using such procedure, every possible location for the block is determined, and the resulting motion vector computed. The motion vector chosen is the one that results in the best match between the estimated image and the current image. Such an approach, however, is computationally inordinately expensive, and is essentially impractical for ordinary use.

There are, however, various fast searching methods for motion estimation. These methods significantly reduce the computational cost of searching, but impose limitations. The essence of these approaches is to reduce the number of block search operations. These approaches can be characterized into two different groups-global search and step by step search. Each of these techniques is individually well known.

In global search approaches for determining the motion vector for a reference block, the system tries to find the best matching block in a frame of video information by moving around the frame at many widespread points and comparing blocks at those locations with blocks in the reference frame. The system tries to match a minimal area first, then refines the search in that area. An example is a three-step search. The system first searches to find a minimal point (point of least difference), then searches blocks that are two pixels away from the minimal point. Finally, the system searches the blocks that are next to the new minimal point. The particular values, of course, can be adjusted for different applications. The average number of operations in this type of global search is on the order of 40. In this method, every possible motion vector in the searching area is checked and compared. The motion vector with the lowest Sum of Absolute Difference value (SAD) of the two compared image blocks is selected, and coded. The result is that a high compression ratio is achieved.

The advantage of such an approach is its ability to quickly approach the minimal area. For fast moving video images, this is important because the matching block may be a relatively long distance, for example, 10 pixels, away from the previous point. The global approach also makes searching time more predictable, because the global search always performs the same number of operations, even if the match is found on the first try.

A second fast search technique is the step by step search. In many types of video, for example, a videoconference environment, the background does not move, and the speaker does not move dramatically. If the encoder has enough computational resources, and encoding at a sufficient rate, for example, more than 10 frames per-second speed, the matching block likely will be found two or three pixels away. Step by step searches from the center thus may provide better results than a global search. One typical example of a step by step search is the diamond search. It begins searching from the center of the window, compares four neighbors (up, down, left, and right), and then selects the best match as the new center. The searching continues until the center does not further change.

In a videoconference environment, objects usually move very little from frame to frame. Typically, if the frame rate on the encoder is faster than 10 frames/second, most movement will be less than four pixels on a CIF image. This step by step search method yields better results in such condition than many other fast searching methods. It is also the best method for processing a background image block because such a block will not move during videoconferencing. Unfortunately, there are significant limitations on this method. If the optimal match is far away from the center, the number of processing steps increases rapidly, raising the processing time dramatically.

Accordingly, what is needed is an improved technique for searching and comparing video frames to provide better data compression on a faster basis.

SUMMARY OF THE INVENTION

This invention speeds compression by reducing the number of times it is necessary for the system to perform comparisons and estimate motion vectors. The new system separates the foreground image from the background image in a low frame rate environment. This separation enables use of an encoder, discussed below, with different algorithms for processing the foreground and background image. By doing so, the system reduces the time needed for motion estimation. This improves compression speed.

In particular, in a preferred embodiment of the system having video compression, a method is provided for estimating a motion vector representative of the difference between a reference frame and a current frame. Each of the reference frame and the current frame include background and foreground data. The operation is carried out by selecting a block of the current frame for analysis, then determining whether the block selected is a foreground block or a background block.

Following that determination, if the block is a foreground block, a comparison of the block with predetermined search points in the reference frame is performed. If the block is a background block, then a comparison of the block with predetermined search points in only a portion of the reference frame is performed. The resulting data is provided to the system for use in compression.

Typically the step of determining whether the block selected is a foreground block or a background block is performed by defining a boundary around a preselected number of search points in the reference frame, and then determining a comparison value for each of the search points inside the boundary and a comparison value for each of the search points near the boundary. If the comparison indicates a closer match for any of the search points near the boundary compared to those inside the boundary, then the block is considered to be a foreground block. Contrarily, if the comparison indicates a closer match for any of the search points inside the boundary compared to those near the boundary, then is considered a background block. Once the block type is determined, the comparison of foreground blocks is performed using a global search, typically a three-step search. The comparison of background blocks is performed using a step by step search, typically a diamond search.

DESCRIPTION OF THE SPECIFIC EMBODIMENTS

H.263 is the video coding algorithm mandated for use in complying with videoconference standard H.323 and H.324. These standards have been put forth by the International Telecommunications Union (ITU). Using H.263 to compress a video stream substantially reduces the bandwidth requirement for transmission of the compressed video signal. Typical compression ratios are 100:1 to 200:1. To achieve this high compression ratio, the computational load on the encoder is high.

The H.263 algorithms consist of two parts: coding and motion estimation/compensation. The greater demand for computational power comes from the motion estimation/compensation portion. About 70 to 80 percent of the computational tasks come from this portion in a typical encoder. To reduce the computational task, a new searching method described below is used. This technique reduces the computational cost by 10% to 25% in low frame-rate conditions.

To reach more than 100:1 compression ratio, H.263 compares two frames a previous image and the current image - to determine the difference. Only the difference is coded and sent; it being assumed that the previous frame is already at the receiver. Furthermore, the algorithm tries to determine if the image is moving, how far it moved, and in which direction. The procedure is called motion estimation. If this method is applied globally, by making detailed comparisons across the entirety of the two images being compared, there is a prohibitively high computation cost. For every 16×16 image block, searching in 48×48 window, 961 sum of absolute difference comparisons are necessary. More than 95% of the encoding time is used for this single operation.

The low frame-rate environment in H.263 exposes various searching methods to their limitations. On one hand, assuming half of the blocks belong to the background a global search will waste processing power to do an unnecessary search. On the other hand, because the foreground tends to move far because of the time lapse between two frames, step by step searches will spend a longer time to find the correct position.

Because a global search is better for moving objects, while the step-by-step search handles background better, combining these two methods creates an improved searching method for a low frame rate environment. Using global search techniques to process the foreground and using step by step search techniques to process the background gives better searching results and requires less computational power.

Figure 1A:
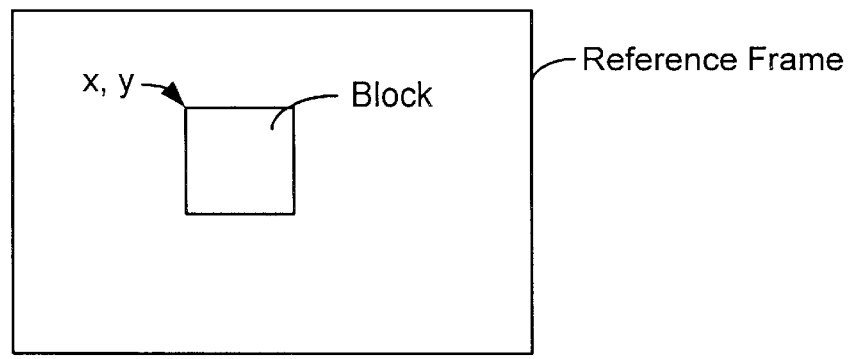
FIG. 1 illustrates the motion estimation process.
Figure 1B:
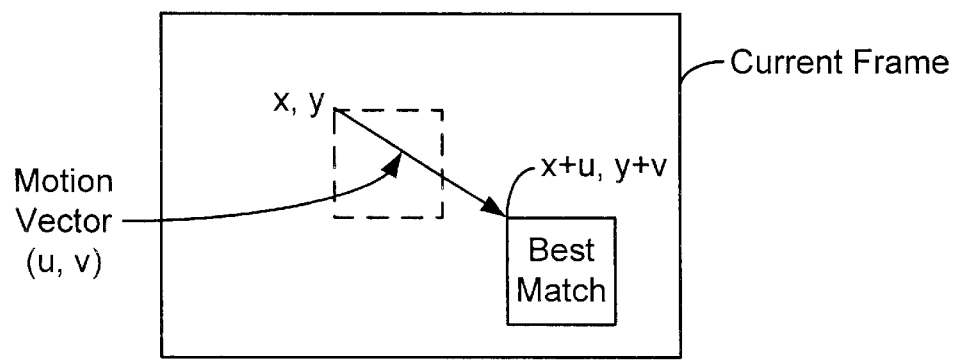
Figure 2:
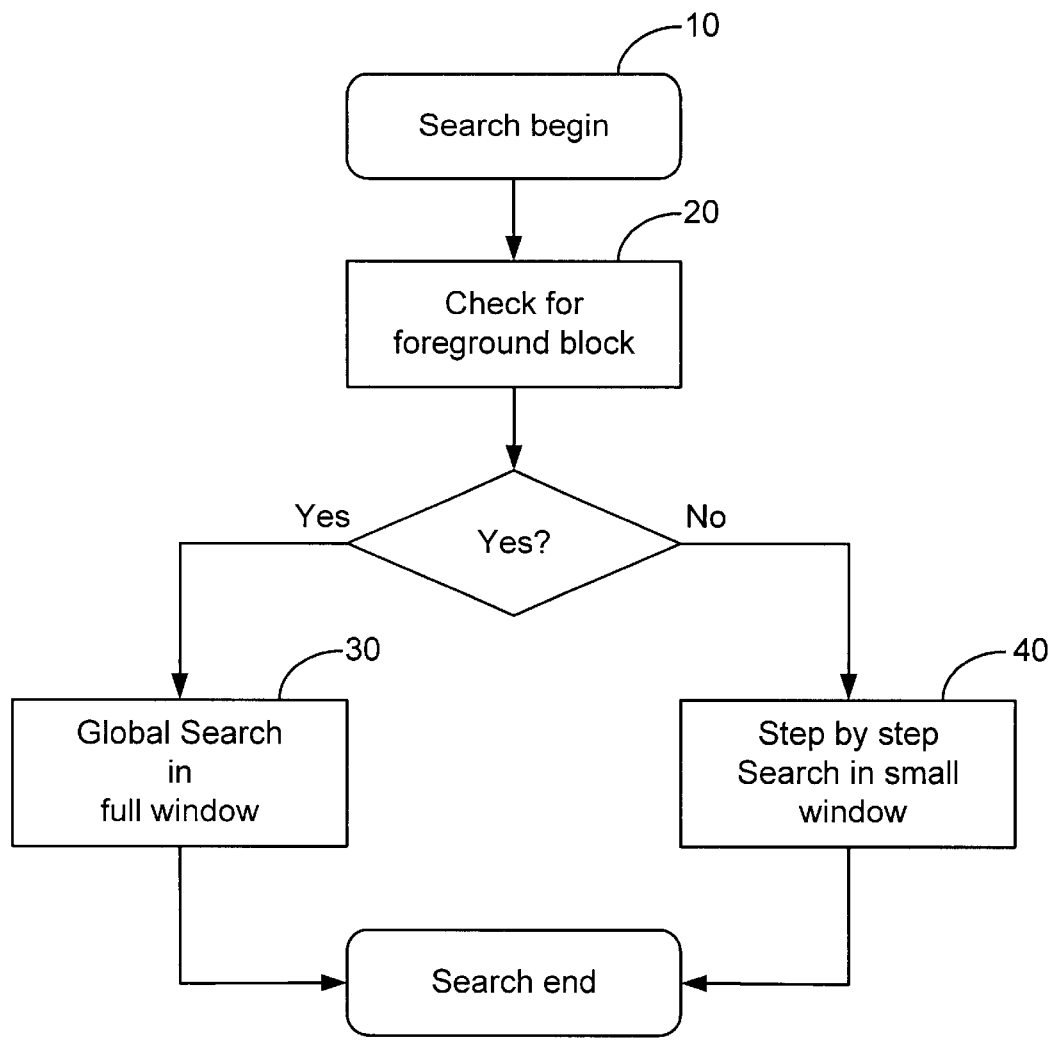
FIG. 2 is a flowchart illustrating a preferred embodiment of the method of this invention.

FIG. 2 illustrates a preferred embodiment of a method of this invention. As shown in FIG. 2, at block 10 a search is begun to compare two frames of video information for the purpose of compressing them by transmission of only the "differences" between the first frame (current) and the second frame (reference). As shown by block 20, a first test is made to determine whether a block being examined is a foreground block or a background block, that is, to separate the foreground from the background. This is achieved by detecting the amount of movement for a current block of the image. To perform this test a set of predetermined points is used as locations for performing comparison calculations for the search. A boundary is created encircling the center of the frame. Some of the predetermined points lie inside the boundary, while others will be near the boundary. Most of the points, however, lie outside the boundary, and are scattered across the frame. As the search is performed, if any of the searching points near the boundary have a lower SAD value than the points inside the boundary, then it is determined that the block belongs to the foreground. On the other hand, if a point within the window boundary has the lowest SAD value, then it is determined that the block belongs to the background.

As shown in FIG. 2, once the block type is determined, if the block is a foreground block, a global search 30, for example, a three-step search, is performed across the full window to determine the movement vector. In a three-step search a table is first searched to find the minimal SAD pixel location, which has been stored as a result of a previous search. Then a search is made using blocks that are two (or other preset number) of pixels to determine a new minimum. This process is repeated until a minimum is found. On the other hand, if the block is a background block, then a step-by-step search, for example a diamond search, is performed within the boundary. In a diamond search, the search begins from the center of the frame, and SAD values are calculated for four neighboring pixels (up, down, left, right). The pixel with minimum SAD value is selected as the new center and the process repeated. The searching combines until the center does not change.

The searching points near the boundary are selected from the pre-determined search table that is used by the three step search. The algorithm checks all the points that meet the distance requirement between the center and the searching point. In the five frame per second QCIF video encoding, four-pixels was selected as the boundary distance. This number can be changed depending on the environment for the encoder.

Figure 3:
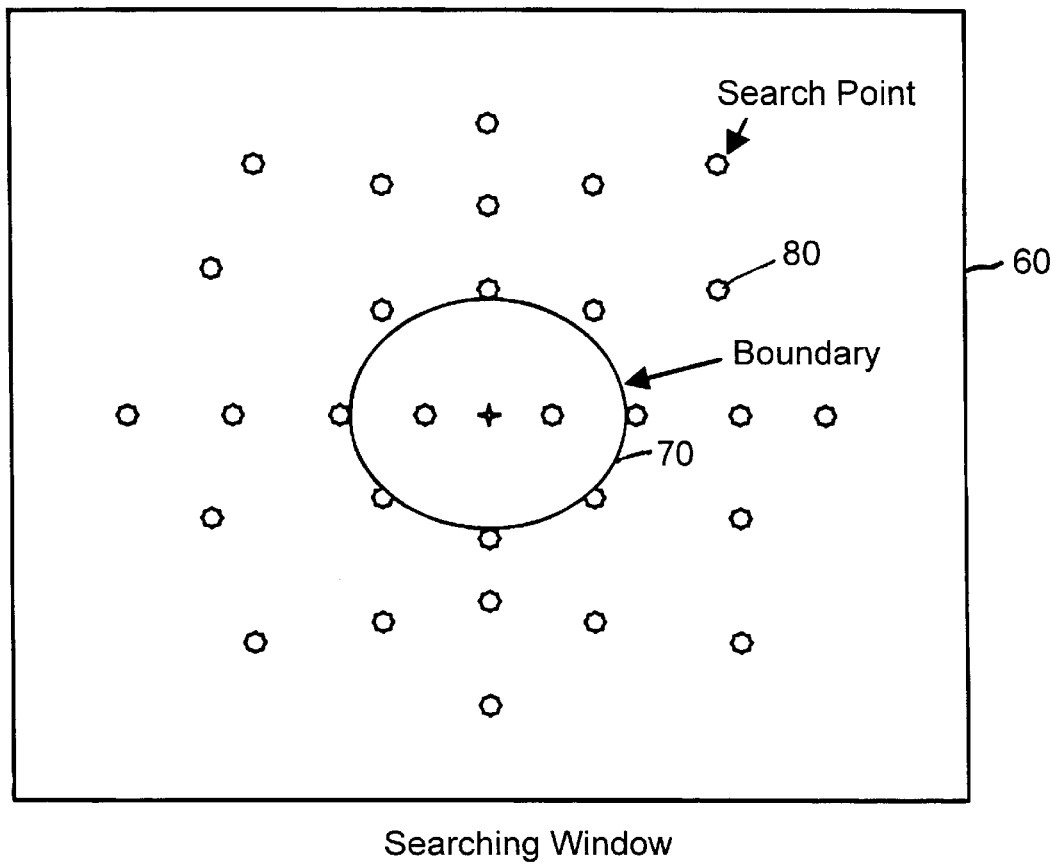
FIG. 3 is an example of one implementation of a preferred embodiment of the method of this invention.

FIG. 3 illustrates an example of the search algorithm described in conjunction with FIG. 2. As shown in FIG. 3, the frame 60 includes a boundary 70 and a series of predetermined search points 80. The searching points are selected from a previously established search table. If any of the searching points near the boundary have a lower SAD value than the searching points inside the boundary, then the block belongs to the foreground, and a three-step search is used. On the other hand, if a search point inside the boundary has the lowest SAD value, then the block belongs to the background, and a diamond search is used. (Search points "near" the boundary in FIG. 3 are considered to be those eight points which touch or almost touch the boundary.)

When the encoder does the motion estimation on any image block, the algorithm will first examine these eight searching points on or immediately adjacent to the boundary, and then compare their SAD values with the SAD value of the center searching points. If the center has the lowest value, the block will be treated as background, and a diamond search will be performed inside the boundary. The total number of SAD operations will be 27. This is calculated by:

$$1+8+3\cdot 6=27 \tag{1}$$

The steps performed are: (1) Find the SAD value of the center point [1 SAD operation]; (2) find the SAD values of the boundary points, which in the preferred embodiment are 4 steps away from the center [8 SAD operations]; and (3) use the "near" method search inside the boundary requiring 6 possible search steps, each with 3 SAD operations [6·3 SAD operations].
On the other hand, if the optimal value is found outside the boundary, the block will be considered as foreground, and a global search will be performed.

As mentioned, if the optimal value is found on the boundary, the block is considered as a foreground block. The global search is then performed, which checks the rest of the searching points within the search window. The total number of SAD operations in this case is:

$$1+8+22+4+8=43 \tag{2}$$

The steps performed are: (1) Find the SAD value of the center point [1 SAD operation]; (2) find the SAD values of 30 points within the boundary [30 SAD operations]; (3) using the smallest SAD value found in the preceding step, search the 4 points near that location [4 SAD operations]; and (4) search all 8 points around the one of four points searched in the preceding step to determine the smallest SAD value [8 SAD operations].

As we can see in the example, this method requires less computation than the three-step search, while it keeps the same coding efficiency. Depending on the different video sequences and different frame-rate, the savings on motion estimation computation range between 10% to 25%.

Figure 4:
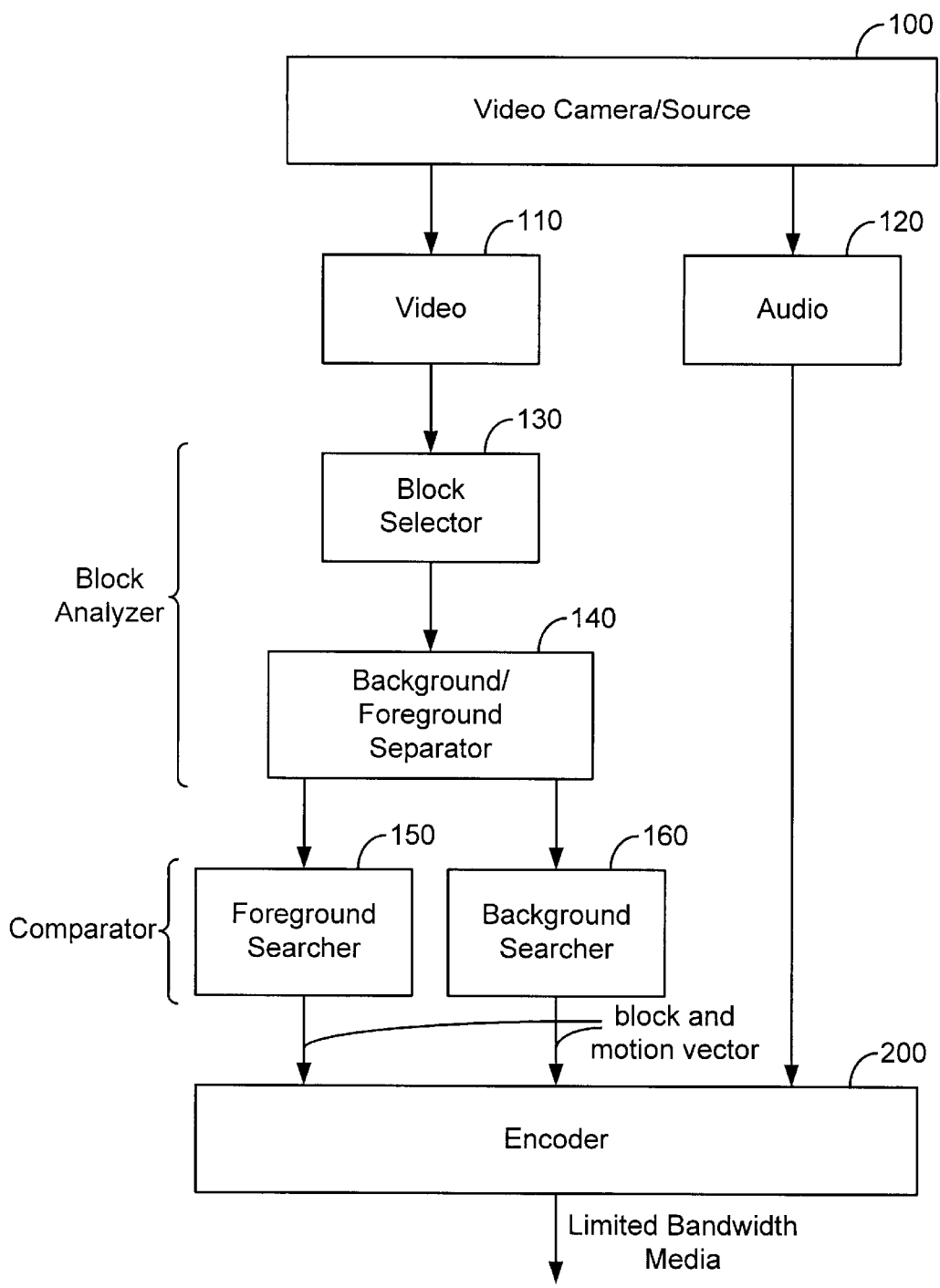
FIG. 4 is an example of one implementation of a preferred embodiment of the apparatus of this invention.

FIG. 4 is a block diagram illustrating a preferred embodiment of the apparatus for carrying out the fast search method of a preferred embodiment of this invention. As shown in FIG. 4, a video camera or other source 100 provides input signals for the apparatus. The input signals are separated into video 110 and audio 120 portions, using well known techniques. The audio signals are supplied directly to an encoder 200 where they are compressed using well known standard audio compression techniques. The video signals, in contrast, are processed by being first supplied to a block selector 130 which chooses a block from the current frame of the video for analysis. This block will be compared to a block in the reference frame. Once the block has been selected, a background/foreground separator 140 is used to compare the block in the current frame with the block in the reference frame and determine whether the block in the current frame is a foreground block or a background block. As described above, a comparison is performed by determining a SAD or other comparison value for each of a set of search points inside a boundary drawn onto the current frame. If the comparison indicates a closer match for the search points near the boundary compared to those inside the boundary, the block is considered to be a foreground block. If the comparison indicates a closer match for any of the search points inside the boundary compared to those near the boundary, the block is considered to be a background block.

Once the block has been identified, it is supplied to a comparator 150 or 160, depending upon the type of block. If the block is a foreground block, foreground searching is performed to compare the block with predetermined search points in the reference frame by performing a global search across the reference frame at the desired search points. Typically, the global search is performed using a three-step search.

If the background/foreground separator 140 has determined that the block is a background block, then background searching is performed using the background searching portion 160 of the comparator. The background searching is performed by comparing the block with predetermined search points in only a portion of the reference frame. Typically, this step is performed by using a step-by-step search, for example, a diamond search.

At the conclusion of the background and foreground searching 150, 160, the resulting block and motion vector information is provided to the encoder 200. Encoder 200 then performs well known compression upon the data. Typical compression techniques include MPEG compression.

The preceding has been description of the preferred embodiment of the invention. It should be appreciated that this explanation has been for illustrative purposes and only of preferred embodiments of the invention. The scope of the invention is set forth in the appended claims.

What is claimed is:

1. In a system having video compression, a method of estimating a motion vector representative of a difference between a reference frame and a current frame wherein the reference frame and the current frame include background and foreground data, the method comprising:

selecting a block of the current frame for analysis;

determining whether the block selected is a foreground block or a background block;

if the block is a foreground block, then performing a comparison of the block with predetermined search points in the reference frame;

if the block is a background block, then performing a comparison of the block with predetermined search points in only a portion of the reference frame; and providing data representative of the results of the comparison performed to the system.

2. A method as in claim 1 wherein the step of determining whether the block selected is a foreground block or a background block comprises:

providing a boundary around a preselected number of search points in the reference frame;

determining a comparison value for each of the search points inside the boundary and near the boundary;

if the comparison indicates a closer match for any of the search points near the boundary compared to those inside the boundary, then considering the block to be a foreground block; and if the comparison indicates a closer match for any of the search points inside the boundary compared to those near the boundary, then considering the block to be a background block.

3. A method as in claim 2 wherein the comparison value is calculated by a sum of absolute difference comparison.

4. A method as in claim 1 wherein the comparison performed in the step of if the block is a foreground block, then performing a comparison of the block with predetermined search points in the reference frame comprises performing a global search over the reference frame.

5. A method as in claim 4 wherein the global search comprises a three-step search.

6. A method as in claim 1 wherein the comparison performed in the step of if the block is a background block, then performing a comparison of the block with predetermined search points in only a portion of the reference frame comprises performing a step by step search.

7. A method as in claim 4 wherein the method further comprises:

providing a boundary around a preselected number of search points in the reference frame; and the step by step search is performed within the boundary.

8. A method as in claim 7 wherein the step by step search comprises a diamond search.

9. Apparatus for performing compression of frames of video data by comparing a reference frame and a current frame comprising:

a block analyzer which selects a block of the current frame for analysis and determines whether the block selected is a foreground block or a background block;

a comparator connected to receive data representative of the selected block, which, if the block is a foreground block, performs a comparison of the block with predetermined search points in the reference frame, and if the block is a background block, performs a comparison of the block with predetermined search points in only a portion of the reference frame; and an output node coupled to the comparator for providing data representative of the results of the comparison.

10. Apparatus as in claim 9 further comprising an encoder coupled to the output node for encoding the data received therefrom.

11. Apparatus as in claim 9 wherein the block analyzer further comprises boundary drawing apparatus for determining a boundary around a preselected number of search points in the reference frame.

12. Apparatus as in claim 11 wherein the block analyzer further comprises a calculation circuit which determines a comparison value for each of the search points inside the boundary and near the boundary.

13. Apparatus as in claim 12 wherein the comparator determines the block to be a foreground block if there is a closer match for any of the search points near the boundary compared to those inside the boundary, and determines the block to be a background block if the comparison indicates a closer match for any of the search points inside the boundary compared to those near the boundary.

14. Apparatus as in claim 13 wherein the comparator performs a sum of absolute difference comparison.

15. Apparatus as in claim 13 wherein the comparator performs a global search over predetermined search points in the reference frame if the block is a foreground block, and performs a step by step search over predetermined search points in a portion of the reference frame if the block is a background block.

16. Apparatus as in claim 13 wherein the comparator performs a global search using a three-step search.

17. Apparatus as in claim 13 wherein the comparator performs the step by step search using a diamond search.

* * * * *